Jan. 13, 1931.  J. H. ROBERTS  1,789,265
UNIVERSAL COUPLING
Filed July 27, 1928
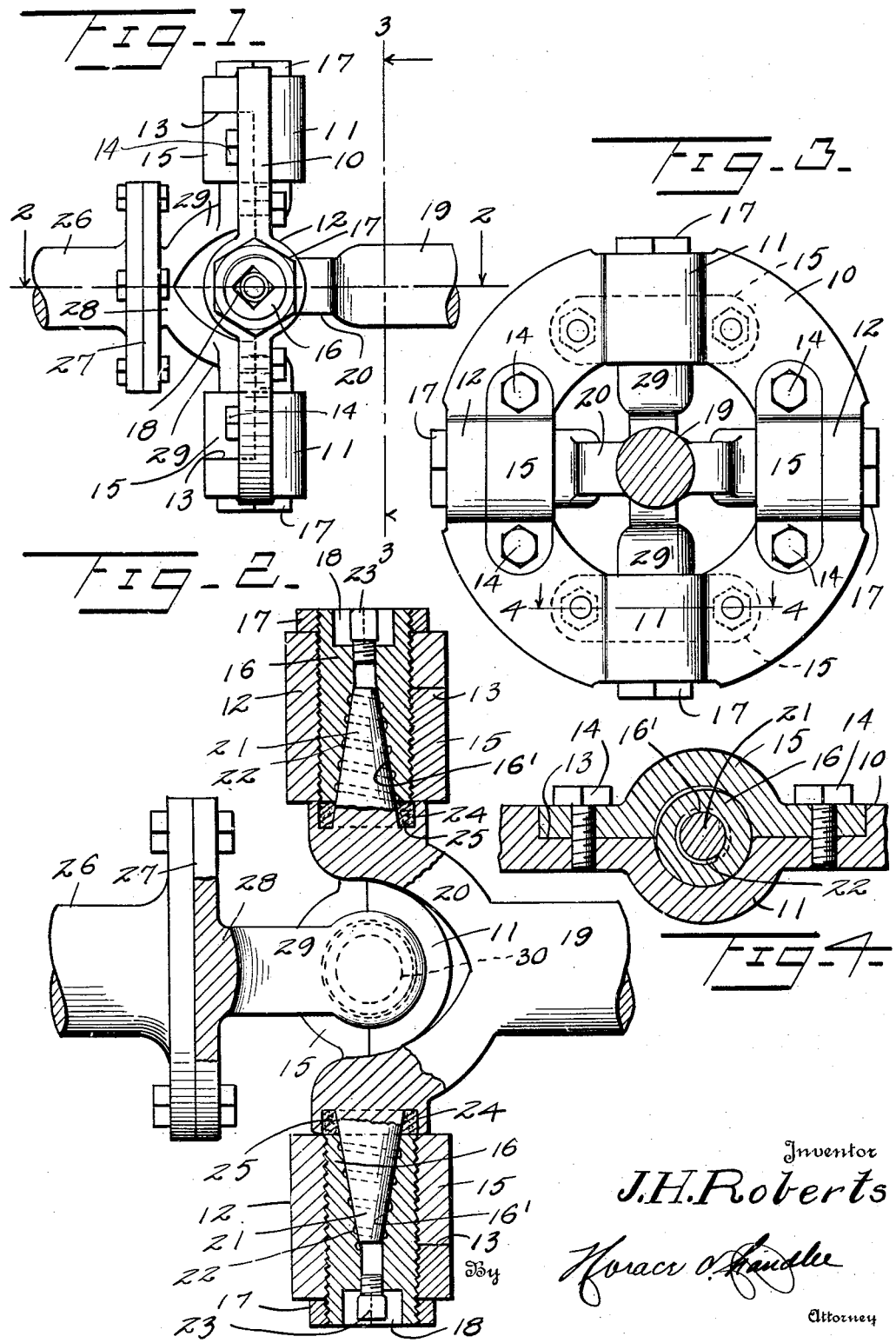

Patented Jan. 13, 1931

1,789,265

UNITED STATES PATENT OFFICE

JAMES H. ROBERTS, OF BLYTHEVILLE, ARKANSAS

UNIVERSAL COUPLING

Application filed July 27, 1928. Serial No. 295,779.

This invention relates to new and useful improvements in couplings, and particularly to universal couplings.

One object of the invention is to provide a universal coupling which is simple in construction, and which can be easily and quickly taken apart for adjustments and repairs.

Another object is to provide a device of this character wherein a single disk or ring supports the members carried by the shaft ends.

Another object is to provide a device of this character which is strong and durable, as well as effective, in its operation.

Other objects and advantages will be apparent from the following description when taken in connection with the accompanying drawing.

In the drawing:

Figure 1 is a side elevation of a universal coupling made in accordance with the present invention.

Figure 2 is horizontal sectional view on the line 2—2 of Figure 1, enlarged.

Figure 3 is a vertical transverse sectional view on the line 3—3 of Figure 1.

Figure 4 is a sectional view on the line 4—4 of Figure 3.

Referring particularly to the accompanying drawing, 10 represents a flat ring which has the four equally spaced radially extending tubular portions 11 and 12 formed therein. The inner portion of each of the tubular portions 11 and 12 is cut away, as indicated at 13, and disposed across said cut away portion, and secured to the face of the ring by means of the bolts 14, are the straps 15, each having its intermediate portion outwardly bowed whereby to take the place of that portion of the ring which has been cut away. The interior of each of the tubular portions 11 and 12 is threaded, and the inner face of the bowed portion of each of the straps 15 is also threaded to conform with, and serve as continuations of the threads of said tubular portions. Engaged in each of the tubular portions and the associated strap 15, is an externally threaded sleeve 16, and formed longitudinally through the center of each of the sleeves is a tapered bore 16', the smaller end of which extends toward the outer periphery of the ring. Engaged on the outer end of the sleeve, which projects beyond the outer end of the tubular portion, is a nut 17, which serves to hold the sleeve against retrograde rotation, and which permits the said sleeve being screwed into the tubular portion to compensate for wear on a part of a shaft carried member which will be described later herein. An angular recess 18 is formed in the outer end of the sleeve for reception of a wrench, by means of which said sleeve may be adjusted or removed.

One shaft end is represented by the numeral 19, and such shaft end is bifurcated at 20, and such furcations extended laterally in opposite directions where they are formed with the outwardly tapering or conical terminals 21. These conical terminals 21 are arranged to be received in the tapered bores of two of the diametrically opposite tubular members of the ring. The surrounding wall of the tapered bore of each sleeve is formed with a spiral groove 22 for delivering lubricant to the contacting faces of such wall and the conical terminal, such lubricant being received from a suitable oil cup 23 mounted within the recess 18. Formed in each furcation, in surrounding relation to the base of the conical terminal 21, is a groove 24 in which is disposed a ring of suitable packing 25, to prevent escape of oil. The other shaft end is represented by the numeral 26, and secured to said shaft end is the disk portion 27 of the other element of the coupling. This element is provided with a bifurcation 28, the furcations 29 of which are of identical form with those previously described, the terminal conical portions 30 of such furcations being rotatably supported in the other diametrically opposite tubular portions. It will be noted that two of the straps 15 are arranged on one face of the ring 10, while the other two are secured to the opposite face thereof.

Should it be desired to take the coupling apart, the operator simply removes the bolts of two diametrically opposite straps 15, after having screwed the sleeves out of the tubular portions, when the conical terminals may be moved laterally through the cut away portions. It will be noted that the outer ends of said conical terminals are disposed slightly inward of inner portion of the cut away, thus permitting easy removal thereof.

As the conical members, and the walls of the bores of the sleeves, wear away, the operator uses a wrench to turn the sleeves inwardly until the proper fit is produced between said members, and then turns up on the nuts to hold the parts in adjusted position.

What is claimed is:

A universal coupling including a flat ring formed with radially extending internally threaded tubular portions, the inner end part of the wall of each tubular portion being cut away at one side of the ring to provide an opening, an outwardly bowed strap removably secured across each of said openings and having its bowed portion threaded in continuation of the threaded interior of the tubular portion, a sleeve threaded into each of the tubular portions and straps and having a central longitudinal outwardly tapering bore, the wall of said tapered bore having a spiral groove, a bifurcated shaft end having the furcations directed laterally away from each other, the outer end of each furcation being formed with a conical member rotatable within a tapering bore, the outer end of the said bore constituting a lubricant chamber delivering into one end of said spiral groove, each of the conical members terminating inwardly of the outer wall of the cut away and having its larger end surrounded by a groove containing packing, whereby to permit bodily removal of the bifurcated shaft end upon removal of said straps.

In testimony whereof, I affix my signature.

JAMES H. ROBERTS.